(12) United States Patent
Kraemer et al.

(10) Patent No.: US 12,352,298 B2
(45) Date of Patent: Jul. 8, 2025

(54) MEASURING DEVICE WITH A FLANGE FOR MOUNTING IN A CONTAINER, FLANGE FOR MOUNTING IN A CONTAINER, AND CONTAINER

(71) Applicant: VEGA Grieshaber KG, Wolfach (DE)

(72) Inventors: Florian Kraemer, Muehlenbach (DE); Patrick Heizmann, Oberwolfach (DE); Stefan Allgaier, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 579 days.

(21) Appl. No.: 17/615,294

(22) PCT Filed: Mar. 30, 2020

(86) PCT No.: PCT/EP2020/058986
§ 371 (c)(1),
(2) Date: Nov. 30, 2021

(87) PCT Pub. No.: WO2020/244825
PCT Pub. Date: Dec. 10, 2020

(65) Prior Publication Data
US 2022/0196046 A1    Jun. 23, 2022

(30) Foreign Application Priority Data

Jun. 7, 2019 (EP) .................................... 19179066

(51) Int. Cl.
*F16B 2/06* (2006.01)
*F16B 2/04* (2006.01)
*G01F 23/284* (2006.01)

(52) U.S. Cl.
CPC ................. *F16B 2/06* (2013.01); *F16B 2/04* (2013.01); *G01F 23/284* (2013.01)

(58) Field of Classification Search
CPC ........ G01F 15/18; G01F 23/284; G01F 23/22; G01F 1/007; G01F 1/52; G01F 11/284;
(Continued)

(56) References Cited

U.S. PATENT DOCUMENTS 3,867,822 A * 2/1975 Morse .................... G01R 11/04
70/164
4,355,828 A   10/1982 Taunton
(Continued)

FOREIGN PATENT DOCUMENTS

CN        206967344 U    2/2018
CN        107926083 A    4/2018
(Continued)

OTHER PUBLICATIONS

International Preliminary Report on Patentability and Written Opinion Issued Dec. 16, 2021 In PCT/EP2020/058986 (submitting English translation only), 9 pages.
(Continued)

*Primary Examiner* — Tran M. Tran
(74) *Attorney, Agent, or Firm* — Oblon, McClelland, Maier & Neustadt, L.L.P.

(57) ABSTRACT

A measuring device is provided, configured to be mounted on or in an opening of a container, the measuring device including: a flange configured to rest on a top of a wall of the container enclosing the opening of the container; and a clamping or spreading device configured to adjust and apply a clamping or spreading force to an underside of the wall or to an inside of the opening to secure the flange to the opening. A flange configured to be mounted on or in an opening of a container, and a container, are also provided.

7 Claims, 3 Drawing Sheets

Figure 1:
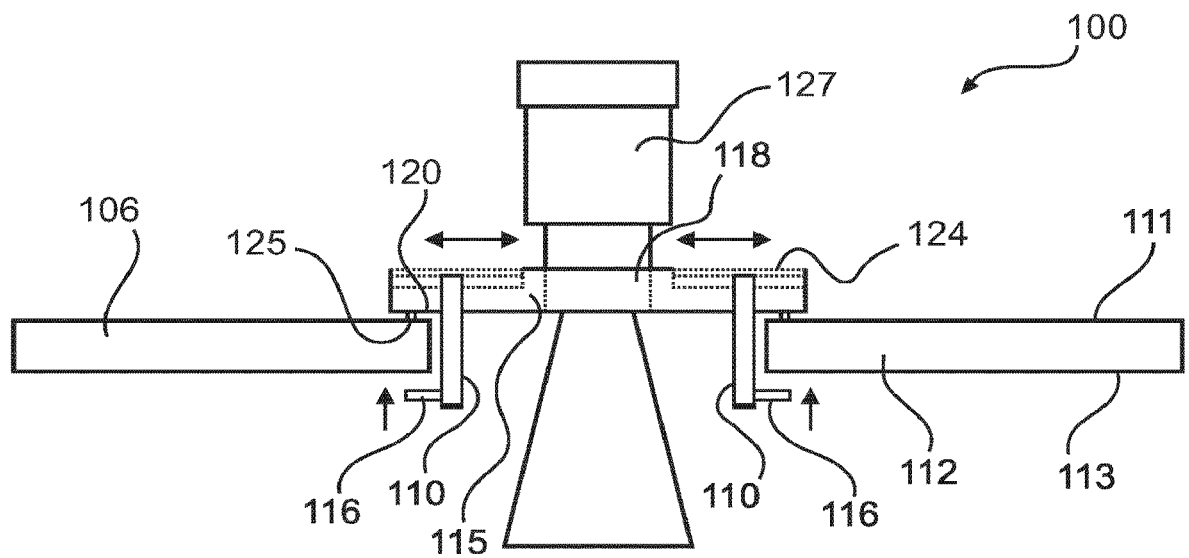

(58) Field of Classification Search
CPC ....... G01F 23/28–2968; G01F 23/0023; G01F 23/003; G01F 23/248; G01F 23/268; H01Q 1/225; F16B 2/12; G01D 11/30; G01D 11/24–245; H01R 13/627
See application file for complete search history.

(56) References Cited

U.S. PATENT DOCUMENTS

| | | | | |
|---|---|---|---|---|
| 4,407,618 | A * | 10/1983 | Kimura | F16B 37/043 |
| | | | | 411/908 |
| 4,942,764 | A * | 7/1990 | Dews | G01F 23/00 |
| | | | | 174/653 |
| 5,877,663 | A * | 3/1999 | Palan | H01Q 19/08 |
| | | | | 333/252 |
| 6,595,051 | B1 * | 7/2003 | Chandler, Jr. | G01F 23/161 |
| | | | | 73/299 |
| 7,311,014 | B2 * | 12/2007 | Fischer | G01K 7/16 |
| | | | | 439/405 |
| 7,626,508 | B2 * | 12/2009 | Kosuge | G01F 23/296 |
| | | | | 340/612 |
| 9,212,941 | B2 * | 12/2015 | Fredriksson | G01F 23/284 |
| 9,291,492 | B2 * | 3/2016 | Fredriksson | G01S 13/88 |
| 9,518,856 | B2 * | 12/2016 | Cobianu | G01F 23/284 |
| 10,224,597 | B2 * | 3/2019 | Blodt | H01Q 13/02 |
| 10,578,478 | B2 * | 3/2020 | Edvardsson | G01F 23/284 |
| 10,725,160 | B2 * | 7/2020 | Larsson | F16B 47/006 |
| 10,969,265 | B2 * | 4/2021 | Fredriksson | G01S 13/88 |
| 11,041,743 | B2 * | 6/2021 | Lais | F16B 2/065 |
| 11,085,806 | B2 * | 8/2021 | Rivera | G01F 23/296 |
| 11,841,261 | B2 * | 12/2023 | Baur | H01Q 1/225 |
| 11,965,767 | B2 * | 4/2024 | Fredriksson | F16L 23/003 |
| 2004/0154392 | A1 | 8/2004 | Reimelt et al. | |
| 2010/0123615 | A1 * | 5/2010 | Fehrenbach | H01Q 19/08 |
| | | | | 342/124 |
| 2017/0227392 | A1 * | 8/2017 | Rivera | G01N 33/00 |
| 2018/0104744 | A1 * | 4/2018 | Spanke | B33Y 50/02 |
| 2018/0113020 | A1 | 4/2018 | Fredriksson et al. | |
| 2018/0259373 | A1 | 9/2018 | Staton et al. | |
| 2019/0316940 | A1 * | 10/2019 | Tener | G01J 5/045 |

FOREIGN PATENT DOCUMENTS

| | | |
|---|---|---|
| DE | 79 13 967 U1 | 10/1979 |
| DE | 100 28 807 A1 | 11/2001 |
| GB | 314569 | 7/1929 |
| GB | 1 285 168 | 8/1972 |
| JP | S55179740 U | 12/1980 |
| JP | 2013072460 A | 4/2013 |

OTHER PUBLICATIONS

German Office Action issued Mar. 2, 2020, in German Patent Application No. 10 2019 208 363.3, 6 pages.
European Search Report issued Dec. 3, 2019 in European Patent Application No. 19179066.6 (with English translation of categories of cited documents), 10 pages.
International Search Report issued on Jun. 15, 2020 in PCT/EP2020/058986 filed on Mar. 30, 2020, 2 pages.
Chinese Office Action issued Apr. 30, 2025 in corresponding Chinese Patent Application No. 202080037127.4, 7 pages, citing documents 15-18 therein.

* cited by examiner

MEASURING DEVICE WITH A FLANGE FOR MOUNTING IN A CONTAINER, FLANGE FOR MOUNTING IN A CONTAINER, AND CONTAINER

REFERENCE TO RELATED APPLICATIONS

This application claims priority to European Patent Application No. 19 179 066.6, filed Jun. 7, 2019, which is incorporated herein by reference in its entirety.

FIELD OF THE INVENTION

The invention relates to measuring devices in an industrial environment. In particular, the invention relates to a measuring device for attachment to or in an opening of a container, a flange adapted for attachment to or in an opening of a container, and a container having a measuring device or flange attached thereto.

BACKGROUND

Measuring devices in the industrial environment may be provided for level measurement, level detection, flow measurement, pressure measurement, level and flow measurement or temperature measurement. Such field devices, hereinafter also referred to as measuring devices, can be designed for mounting on or in an opening of a vessel. This attachment is either by means of a flange attachment or a screw-in attachment. In the case of flange mounting, the measuring device, for example a level measuring device, has a plate-shaped flange which surrounds the antenna neck of the device in a flange-like manner in order to be screwed to a corresponding mating flange in the region of the opening of the container.

In the case of screw-in mounting, the antenna neck itself is equipped with an external thread so that the level measuring device can be screwed into a corresponding internal thread in a corresponding container opening via the external thread.

It is also possible to mount sensors using mounting brackets or clamps.

SUMMARY

It is an object of the invention to provide an alternative means of attaching measuring instruments to a container.

This object is solved by the subject-matter of the independent patent claims. Further embodiments of the invention result from the subclaims and the following description of embodiments.

A first aspect of the invention relates to a measuring device configured to be mounted on or in an opening of a container. The measuring device comprises a flange adapted to rest on the top side of a wall of the container surrounding (enclosing) the opening of the container. A clamping or spreading device, also referred to as tensioning or expanding device, is provided which is configured to adjust and apply a tensioning or expanding force to the underside of the wall or to the inside of the opening to secure the flange to the opening.

This enables universal sensor mounting for a large number of different openings of containers or other measuring arrangements.

A special mounting flange does not have to be used, even if no suitable mounting opening (e.g. flange or threaded connection) is available. There is also no need to attach a corresponding thread to the sensor. This means that the mounting and manufacturing effort can be reduced.

Depending on the container design, flange or thread mounting may not be technically possible, for example in the case of containers made of thin-walled sheet metal or plastic containers. In this case, the operator must create individual mounting options.

The measuring device can be easily and quickly mounted on the process connection with its flange and the clamping or spreading device by means of spreading and clamping technology. The dependence on special mounting devices, such as flanges or threads, at the measuring point is eliminated. A simple opening on the vessel or other measuring arrangement is sufficient. The opening can be of any design, as the clamping or spreading device can be adjusted to different opening diameters and cross-sections by pushing it radially outwards or inwards.

The measuring device can be designed for process automation in an industrial environment. The term "process automation in the industrial environment" can be understood as a subfield of technology which includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density can be monitored and settings for the entire plant can be changed manually or automatically.

A subarea of process automation in the industrial environment concerns logistics automation. With the help of distance and angle sensors, processes within a building or within an individual logistics facility are automated in the area of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another subarea of process automation in the industrial environment concerns factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

According to one embodiment, the measuring device comprises a flange seal arranged at the bottom of the flange and adapted to be pressed against the top of the wall of the container when the clamping force or spreading force is exerted. This integrated seal can ensure that the measuring point can still be sealed against the process. This means that measuring devices with a standardized process connection can be used and individual spare parts can be dispensed with.

According to a further embodiment, the clamping or spreading device comprises a clamping screw and a clamping element which can be displaced in the direction of the underside of the flange by rotating the clamping screw to exert the clamping force.

Furthermore, a frame may be provided in which the clamping screw is held and which, together with the clamping screw, can be displaced radially outwards along a slot-like recess in the flange so that the clamping or spreading device can be adjusted to different opening diameters and cross-sections.

According to a further embodiment, the flange comprises an internally threaded aperture or bore adapted for screwing in a measuring device housing having a corresponding external thread to secure the measuring device housing to the flange.

This external thread can be located, for example, on the neck of the antenna.

According to a further embodiment, the measuring device further comprises a screw mechanism, for example in the form of a screw or a clamping nut, which is attached to an external thread of the measuring device housing. The clamping or spreading mechanism comprises a spreading bracket, wherein the flange is arranged, for example, between the clamping nut and the spreading bracket. By actuating the screw mechanism, the flange is pressed against the spreading bracket to spread it radially outwards to generate the spreading force.

The fastening device described in the preceding paragraph may be used as an alternative or in addition to the fastening device with the clamping screw and the clamping element described further above.

According to a further embodiment, the measuring device comprises an internal circumferential seal arranged between the measuring device housing and the flange. In particular, this circumferential seal can be in the form of a sealing ring or O-ring.

According to a further embodiment, the measuring device comprises a second clamping or spreading device, wherein both clamping or spreading devices are mounted on the flange opposite each other.

According to a further embodiment, the measuring device comprises a second and a third clamping or spreading device. Further clamping or spreading devices may also be provided. In this embodiment, all clamping or spreading devices are attached to the flange at the same radial distance from the center of the flange, with adjacent clamping or spreading devices including the same angle.

Another aspect relates to a flange adapted to be mounted to or within an opening of a container. The flange comprises an aperture adapted to receive and hold a measuring device, for example, which can be screwed or pushed therein.

There is provided a flange underside adapted to bear on the upper surface of a wall of the container enclosing or forming the opening of the container. Further, the flange comprises a clamping device adapted to adjust and apply a clamping force to the underside of the wall or to the inside of the opening to secure the flange to the opening.

At this point, it should be noted that the flange may have any of the features described above and in the following figure description in connection with the measuring device.

Another aspect relates to a container having a measuring device and/or flange attached thereto as described above and below.

In particular, the container may be a plastic container or a thin-walled sheet metal container. Further embodiments are described below with reference to the figures. The representation in the figures is schematic and not to scale. If the same reference signs are used in the following description of figures, these designate identical or similar elements.

SHORT DESCRIPTION OF THE FIGURES

Figure 2:
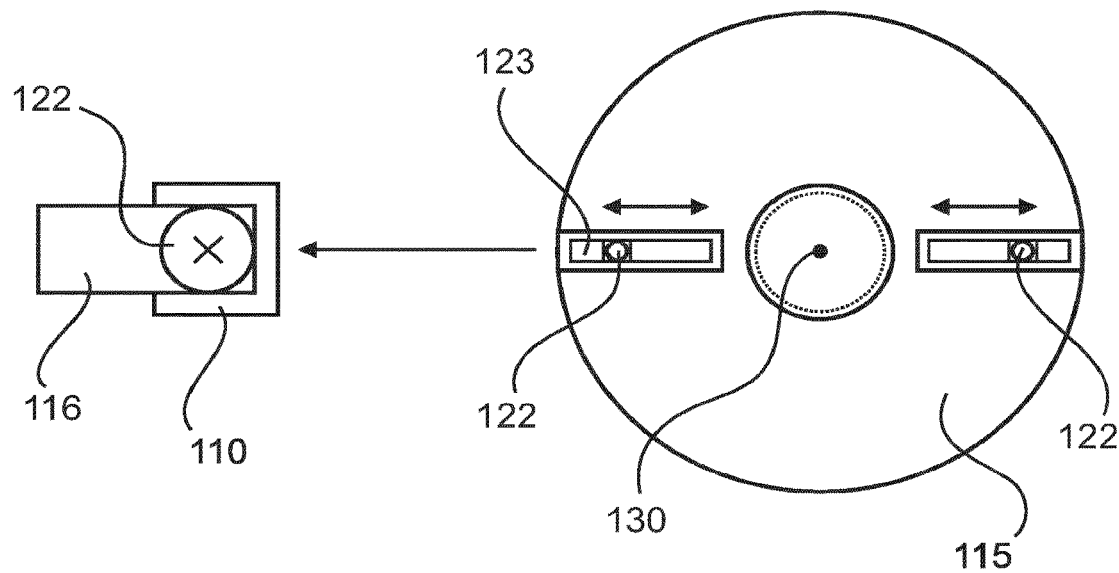
Figure 3:
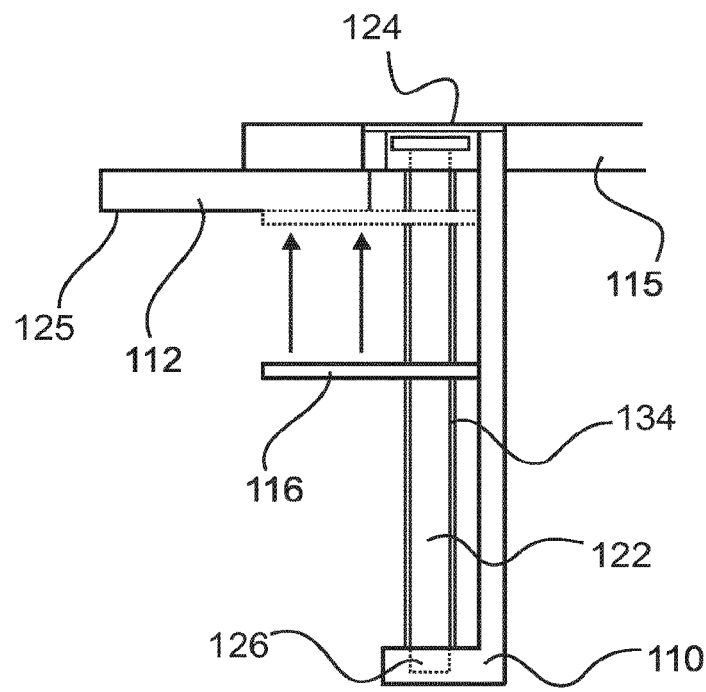
Figure 4:
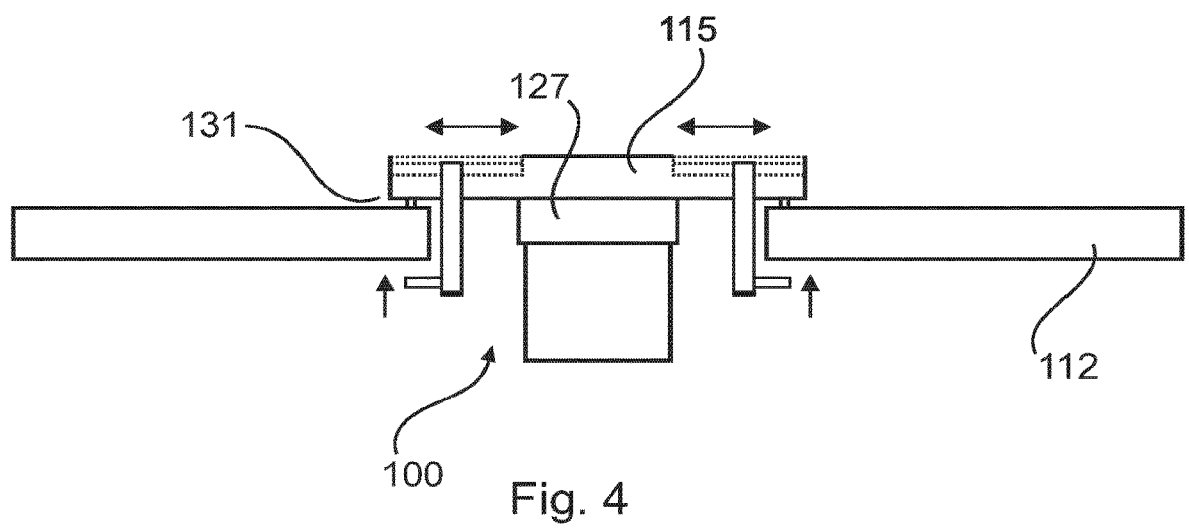
Figure 5:
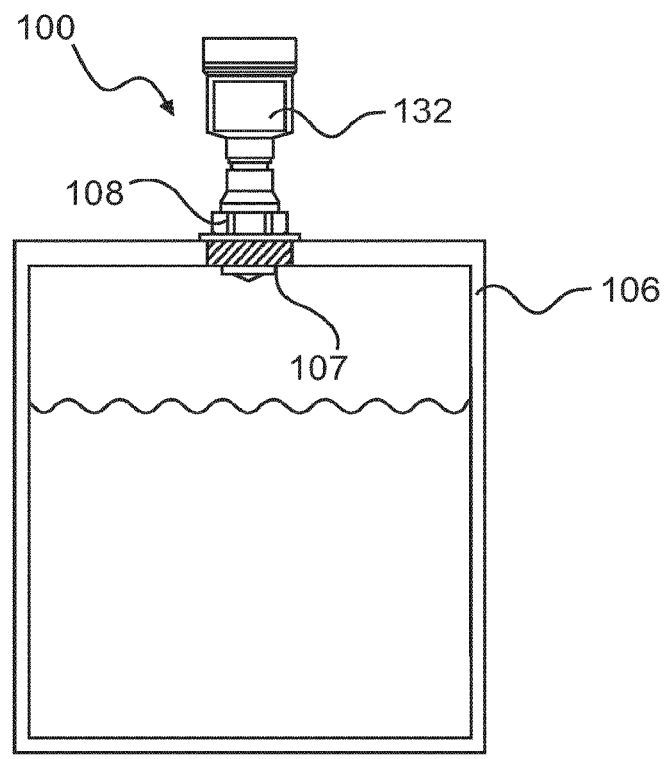
Figure 6:
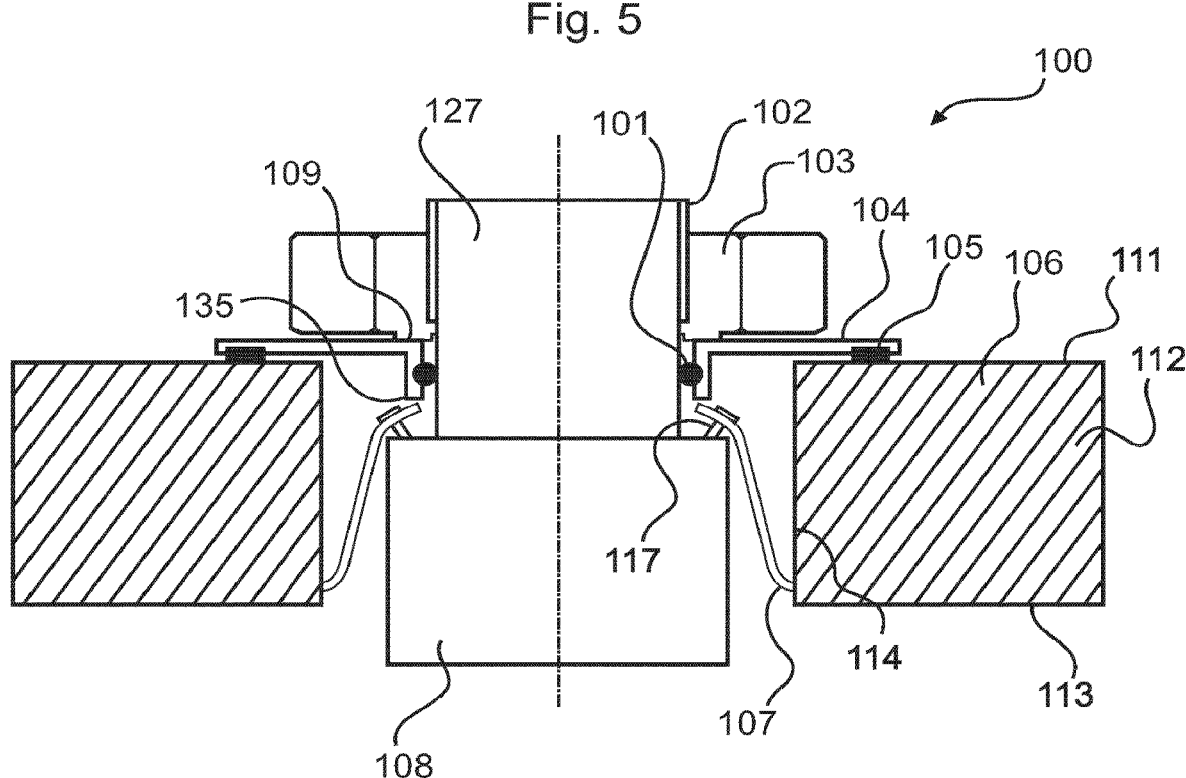

FIG. 1 shows a cross-sectional view of a measuring device according to a first embodiment.
FIG. 2 shows a top view of a flange.
FIG. 3 shows a detailed view of a clamping device.
FIG. 4 shows a measuring device according to a further embodiment.
FIG. 5 shows a measuring device and a container according to a further embodiment.
FIG. 6 shows a measuring device according to a further embodiment.

DETAILED DESCRIPTION OF EMBODIMENTS

FIG. 1 shows a measuring device 100 having a flange 115 attached to the wall 112 of a container 106 by means of a clamping or spreading device 110, 116.

The measuring device 100 has a measuring device housing 127, which has a horn antenna on the side facing the process, with an external thread on its neck. This external thread is screwed into the opening 118 of the flange 115. The flange bottom 120 rests on the top 111 of the vessel wall 112, and a sealing ring 125 may be disposed between the flange bottom 120 and the wall top 111.

Two horizontally slidable clamping elements 110, 116 are provided which can be slid radially outwardly along the flange until they abut the container opening.

When the clamping screws 122 of the two clamping devices 110, 116 are actuated (see FIGS. 2 and 3), the clamping connection 116, for example in the form of a clamping plate, is pushed vertically upwards by the clamping screw 122 towards the underside 113 of the container wall 106, as shown in particular in FIG. 3.

Optionally, a cover 124 may be provided to seal the horizontally adjustable clamping device 110, 116.

FIG. 2 shows a top view of the flange of FIG. 1 in an overall view (right) and a detail view (left). The flange 115 has two opposing concentrically arranged clamping devices, each having a clamping screw 122. The clamping screw is horizontally slidable within the slot-like recess 123. As shown in the left half of FIG. 2, the clamping screw 122 is located in a frame 110 in which the clamping screw is held, and which is slidable together with the clamping screw along the slot-like recess 123 in the flange 115.

Furthermore, a type of tube 134 may be provided in which the clamping screw is located. A recess 126 is provided in the lower base portion of the frame 110, which receives the tip of the clamping screw.

FIG. 4 shows an arrangement with a measuring device mounted below the sealing plane 131, which is screwed into the flange 115 from below.

FIG. 5 shows a measuring device attached to a container 106 in the form of a level radar with an electronics housing 132 and a clamping or spreading device 107.

FIG. 6 shows a detailed sectional view of a clamping or spreading device. The clamping or spreading device may also be referred to as a spreading and clamping unit. The measuring device 100 has an external thread 102 on a neck of the housing 127, and is inserted manually through a predetermined opening of the container 106. With the aid of the clamping nut 103, which has a shortened contact surface 109, the flange plate 104 with seal 105, 101 and spreader actuator 135 is pressed against the container wall, and in particular against the upper side 111 of the container wall 112. Subsequently, the rotational movement of the nut presses the spreader brackets 107 against the inner surface 114 of the container opening through the spreader actuator 135 and the bracket suspension 117. By a corresponding embodiment of the spreader brackets, the flange plate is pulled towards the upper side 111 of the container wall 112. Thus, an optional seal to the process and a secure attachment can be provided.

For this purpose, the spreader bars 107 are S-shaped so that the downward compressive force of the spreader actuator 135 on one end of the spreading bracket 107 causes a radially outward movement of the other end with a superimposed upward movement.

The internal seal 101 moves on a smooth surface (sliding surface) during the clamping process to avoid deformation and thus damage to the seal and to ensure the sealing function.

Frictional forces are minimized by a reduced contact surface of the clamping nut on the flange plate 104. This prevents twisting of the flange plate during the clamping process.

For correct assembly, at least two spreader bars 107 are advantageous. However, three, four or more spreader bars may also be provided.

Due to the spreading and clamping technique at the sensor process connection, universal mounting at openings on or above measuring instruments is possible.

Due to the individually adjustable clamping technique, sensors can be easily and quickly and safely mounted in thin-walled containers or other measuring arrangements with an opening of any kind.

Due to the spreading technique, measuring devices can be easily and quickly mounted securely on thick-walled containers with an appropriate bore (or round opening).

The diameter of the opening in the vessel or at the measuring point must correspond to the spreader on the measuring device. Different versions of the spreader can be used to cover and seal different diameters of the opening.

It can also be provided that appropriate adapter flanges with standardized sensor connection (for example G ½ inch or NPT connection thread) are offered for both the spreading and the clamping technology. Stocking sensors with different process connections is no longer necessary.

Supplementally, it should be noted that "having" and "comprising" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A measuring device configured to be mounted on or in an opening of a container, the measuring device comprising:
   a flange configured to rest on a top of a wall of the container enclosing the opening of the container;
   a spreading device configured to adjust and apply a spreading force to an inside of the opening to secure the flange to the opening when the measuring device is mounted on or in the opening of the container; and
   a screw or a clamping nut,
   wherein the spreading device comprises a spreading bracket, and
   wherein the flange is disposed between the screw or the clamping nut and the spreading bracket so that when the screw or the clamping nut is screwed in, the flange is pushed towards the spreading bracket and presses against the spreading bracket and spreads the spreading bracket radially outwardly to generate the spreading force to the inside of the opening.

2. The measuring device according to claim 1, further comprising:
   a flange gasket arranged on a flange bottom and configured to be pressed against the top of the wall of the container when the spreading force is exerted.

3. The measuring device according to claim 1, further comprising:
   an internal circumferential seal disposed between the measuring device housing and the flange.

4. The measuring device according to claim 1, further comprising:
   a second spreading device,
   wherein both spreading devices are mounted on the flange opposite each other.

5. The measuring device according to claim 1, further comprising:
   a second and a third spreading device,
   wherein all of the spreading devices are mounted on the flange at a same radial distance from a center point of the flange.

6. A container, comprising:
   a measuring device attached to the container, the measuring device comprising:
      a flange configured to rest on a top of a wall of the container enclosing an opening of the container,
      a spreading device configured to adjust and apply a spreading force to an inside of the opening to secure the flange to the opening when the measuring device is mounted on or in the opening of the container; and
      a screw or a clamping nut,
      wherein the spreading device comprises a spreading bracket, and
      wherein the flange is disposed between the screw or the clamping nut and the spreading bracket so that when the screw or the clamping nut is screwed in, the flange is pushed towards the spreading bracket and presses against the spreading bracket and spreads the spreading bracket radially outwardly to generate the spreading force to the inside of the opening;
   or
   a flange attached to the container, the flange comprising:
      an opening configured to receive and hold a measuring device,
      a flange bottom configured to bear on a top of a wall of the container enclosing the opening of the container,
      a spreading device configured to adjust and apply a spreading force to an inside of the opening to secure the flange to the opening when the measuring device is mounted on or in the opening of the container; and
      a screw or a clamping nut,
      wherein the spreading device comprises a spreading bracket, and
      wherein the flange is disposed between the screw or the clamping nut and the spreading bracket so that when the screw or the clamping nut is screwed in, the flange is pushed towards the spreading bracket and presses against the spreading bracket and spreads the spreading bracket radially outwardly to generate the spreading force to the inside of the opening.

7. The container according to claim 6, wherein the container is a plastic container.

\* \* \* \* \*